J. GRAY.
Grain Separator.
No. 1,795.
Reissued Oct. 18, 1864.
Fig. 1
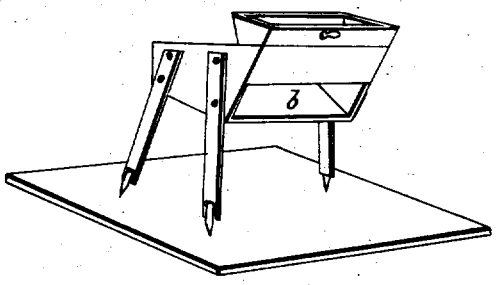
Fig. 4
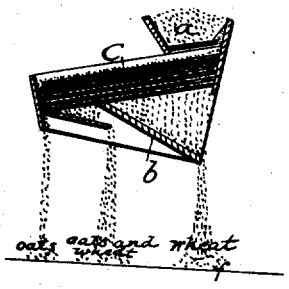
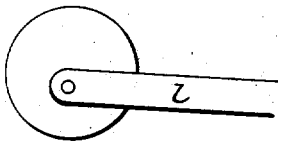
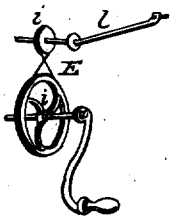
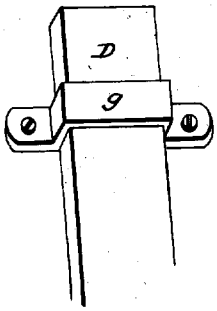
Fig. 2.
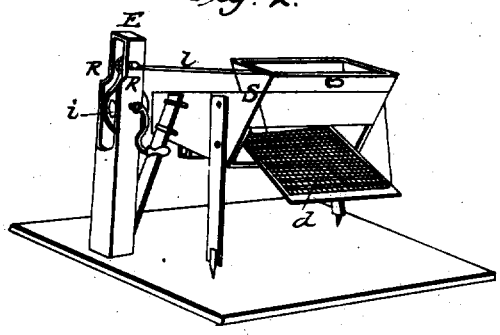
Fig. B
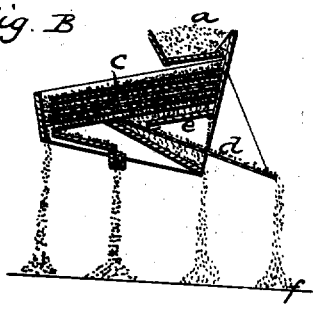
Attest
F. W. Pitkin
R. L. Day
Inventor
John Gray
N. PETERS, Photo-Lithographer, Washington, D. C.

UNITED STATES PATENT OFFICE.

JOHN GRAY, OF MILWAUKEE, WISCONSIN.

IMPROVEMENT IN GRAIN-SEPARATORS.

Specfication forming part of Letters Patent No. 41,000, dated December 22, 1863; Reissue No. 1,795, dated October 18, 1864.

*To all whom it may concern:*

Be it known that I, JOHN GRAY, of the city of Milwaukee, in the county of Milwaukee and State of Wisconsin, have invented certain new and useful Improvements to "Booth's Compound Shaker," for separating wheat from oats and other kinds of grain; and I do hereby declare that the following is a full, clear, and exact description of the said invention and improvements, reference being had to the cuts and drawings hereunto annexed, making a part of this specification, in which—

Figure 1 represents Booth's compound shaker in operation; Fig. A, a sectional view of the same, wherein C indicates a set of perforated zinc screens arranged parallel with each other, *a* the hopper, and *b* an inclined table which conveys the wheat and the small seeds to the floor *f*. Fig. 2 represents Booth's compound shaker with the application of my improvements attached, consisting of a screen, *d*, a back-fall, *e*, slide-legs D, and a crank-power, E. Fig. B represents a sectional view of Booth's compound shaker with the application of my improvements, screen and back-fall, attached. Fig. D represents the slide-legs, and Fig. E the crank-power.

My improvements to the said shaker consist, first, in the application of one or more screens, *d*, as seen in Fig. B, placed in the wheat-discharge, and movable to any desired angle for the purpose of separating the small seeds—such as cockle and other extraneous seeds—from the wheat, and selecting the choicest berries for seed, together with the back-fall *e*, which, by conducting the wheat and smaller seeds that fall through the sieve C to the upper part of the screens first, give the advantage of the whole surface of said screens.

My second improvement to Booth's compound shaker consists in elevating or depressing the set of zinc sieves C at any desired angle, which is accomplished by means of the slide-legs represented by Fig. D, which are secured to the machine by means of straps and screws, as indicated by *g g*, or by means equivalent. This improvement renders one set of sieves suitable for wheat of different-sized berries, thereby producing the same result as if sieves of different-sized holes were substituted.

My third improvement to the said shaker consists in the application of a crank-power. (Represented by Fig. E.) This power is obtained by means of a crank attached to a wheel and pinion, *i i*, placed between two upright posts, R R, connected with the machine by means of an eccentric-rod, *l*. The application of this power gives to the machine a quick vibrating motion, thereby causing the wheat to pass through the sieves C and the oats to glide over the same more readily than when the machine is shaken by hand.

I therefore claim as new and my own invention and desire to secure by Letters Patent of the United States—

1. The combination, with Booth's compound shaker for separating wheat from oats, &c., of the movable screen *d*, for the purpose of more fully separating the smaller seeds, &c., from the wheat.

2. In combination with said shaker, the screen *d* and back-fall *e*, for the purposes herein recited.

3. The application of the slide-legs D to Booth's compound shaker for the purpose of elevating and depressing the zinc sieves C to any desired angle.

4. The application of the crank-power E and the eccentric rod *l* to Booth's compound shaker, said crank-power and eccentric-rod being arranged and attached in manner substantially as above set forth, for the purpose of producing upon the machine a quick vibratory motion; and I hereby enter my disclaimer to the machine heretofore patented and known as "Booth's compound shaker," and claim only the improvements above set forth to said machine.

This specification signed this 16th day of September, 1864.

JOHN GRAY.

Witnesses:
F. F. NILDE,
WALTER S. CARTER.